United States Patent
Reif (10) Patent No.: US 9,025,863 B2
(45) Date of Patent: May 5, 2015

(54) DEPTH CAMERA SYSTEM WITH MACHINE LEARNING FOR RECOGNITION OF PATCHES WITHIN A STRUCTURED LIGHT PATTERN

(71) Applicant: Intel Corporation, Santa Clara, CA (US)

(72) Inventor: Dror Reif, Be'er-Yacoov (IL)

(73) Assignee: Intel Corporation, Santa Clara, CA (US)

( * ) Notice: Subject to any disclaimer, the term of this patent is extended or adjusted under 35 U.S.C. 154(b) by 48 days.

(21) Appl. No.: 13/929,272

(22) Filed: Jun. 27, 2013

(65) Prior Publication Data

US 2015/0002628 A1    Jan. 1, 2015

(51) Int. Cl.
  *G06K 9/00* (2006.01)
  *G06T 7/00* (2006.01)
  *H04N 13/02* (2006.01)
(52) U.S. Cl.
  CPC ............. *G06T 7/0044* (2013.01); *G06T 7/0055* (2013.01); *H04N 13/0203* (2013.01)
(58) Field of Classification Search
  USPC .......... 382/154, 156, 158, 159; 345/653, 664, 345/679
  See application file for complete search history.

(56) References Cited

U.S. PATENT DOCUMENTS

| | | | |
|---|---|---|---|
| 6,275,718 B1 * | 8/2001 | Lempert ....................... | 600/407 |
| 7,626,569 B2 * | 12/2009 | Lanier ........................... | 345/156 |
| 7,916,293 B2 * | 3/2011 | Mitchell et al. ............... | 356/336 |
| 8,175,337 B2 | 5/2012 | Park et al. | |
| 8,263,129 B2 * | 9/2012 | DeSimone et al. ........... | 424/489 |
| 8,420,124 B2 * | 4/2013 | DeSimone et al. ........... | 424/499 |
| 8,705,036 B2 * | 4/2014 | Peters ........................... | 356/434 |
| 2004/0005092 A1 | 1/2004 | Tomasi | |
| 2009/0097039 A1 | 4/2009 | Kawasaki et al. | |
| 2012/0194517 A1 | 8/2012 | Izadi et al. | |

FOREIGN PATENT DOCUMENTS

KR    10-0914033 B1    8/2009

OTHER PUBLICATIONS

International Search Report and Written Opinion received for PCT Patent Application No. PCT/US2014/043157, mailed on Oct. 21, 2014, 9 pages.

* cited by examiner

*Primary Examiner* — Yosef Kassa
(74) *Attorney, Agent, or Firm* — Grossman, Tucker, Perreault & Pfleger, PLLC (57) ABSTRACT

Generally, this disclosure provides systems, devices, methods and computer readable media for a depth camera with ML techniques for recognition of patches within an SL pattern. The system may include a projection module to project an ML-based SL pattern onto a scene; a camera to receive an image of the SL pattern reflected from the scene; a patch recognition and location module to generate a descriptor vector for a patch segmented from the received image and to query an ML system with the descriptor vector, the ML system configured to provide a patch label associated with the descriptor vector, the patch label comprising a location of the patch relative to the projected SL pattern; and a depth estimation module to triangulate a distance between the camera and a region of the scene associated with the patch based on the location of the patch relative to the projected SL pattern.

28 Claims, 10 Drawing Sheets

```
┌─────────────────────────────────────────────────────────────────┐
│ Segment a patch from an SL pattern, the patch comprising a plurality of pixels │
│                              910                                │
└─────────────────────────────────────────────────────────────────┘
                                │
                                ▼
┌─────────────────────────────────────────────────────────────────┐
│    Select a pixel from the plurality of pixels associated with the patch    │
│                              920                                │
└─────────────────────────────────────────────────────────────────┘
                                │
                                ▼
┌─────────────────────────────────────────────────────────────────┐
│ Calculate a descriptor value for the selected pixel, the descriptor value based on │
│   comparisons of a numerical value of the selected pixel to numerical values of a  │
│                    plurality of neighboring pixels              │
│                              930                                │
└─────────────────────────────────────────────────────────────────┘
                                │
                                ▼
┌─────────────────────────────────────────────────────────────────┐
│ Generate a descriptor vector comprising a plurality of the descriptor values, each │
│   of the descriptor values associated with one of a plurality of the selected pixels │
│                              940                                │
└─────────────────────────────────────────────────────────────────┘
                                │
                                ▼
┌─────────────────────────────────────────────────────────────────┐
│  Query an ML system with the descriptor vector, the ML system configured to  │
│  provide a patch label associated with the descriptor vector, the associated patch │
│     label comprising a location for the patch relative to the SL pattern     │
│                              950                                │
└─────────────────────────────────────────────────────────────────┘
```

DEPTH CAMERA SYSTEM WITH MACHINE LEARNING FOR RECOGNITION OF PATCHES WITHIN A STRUCTURED LIGHT PATTERN

FIELD

The present disclosure relates to depth camera systems, and more particularly, to depth camera systems with machine learning techniques for recognition of patches within a structured light pattern and for generation of structured light patterns.

BACKGROUND

Depth cameras, or three dimensional (3D) cameras, are generally able to estimate the distance between the camera and various points in the objects or scenes being imaged. This distance information allows for the determination of depth across the surface of the objects which in turn enables the generation of a 3D image of the scene. These 3D images are useful in computer vision applications and for an increasing number of applications involving human-computer interaction.

Depth cameras, however, are often complex and expensive. One approach to implementing a depth camera uses structured light (SL) where a known or pre-defined pattern is projected onto the scene and a camera system attempts to capture and identify elements in the pattern. The identified elements and their location within the pattern may then be used to triangulate between the camera and the projector to estimate the depth of the scene at the location of that element. Unfortunately, the SL pattern that is captured by the camera typically differs from the SL pattern that was projected. There may be many reasons for this, including imperfections in the projector and the camera, focus problems, noise, distortion, interference and variations in reflective surfaces in the scene. These and other issues can increase the difficulty associated with correctly identifying elements in the SL pattern, resulting in errors which may adversely affect the ability of the system to estimate depth and generate a 3D image of acceptable accuracy.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides systems, devices, methods and computer readable media for a depth camera with machine learning (ML) techniques for recognition of patches within a structured light (SL) pattern and for generation of SL patterns that improve recognition performance. The recognition of patches allows for the determination of an associated location for that patch relative to the overall SL pattern. That location may be used to triangulate between a projector and a camera to estimate the depth of a scene at the point where the patch is projected. By estimating depths at a number of points throughout the scene, each point associated with a patch, a 3D image of the scene may be generated.

Figure 1:
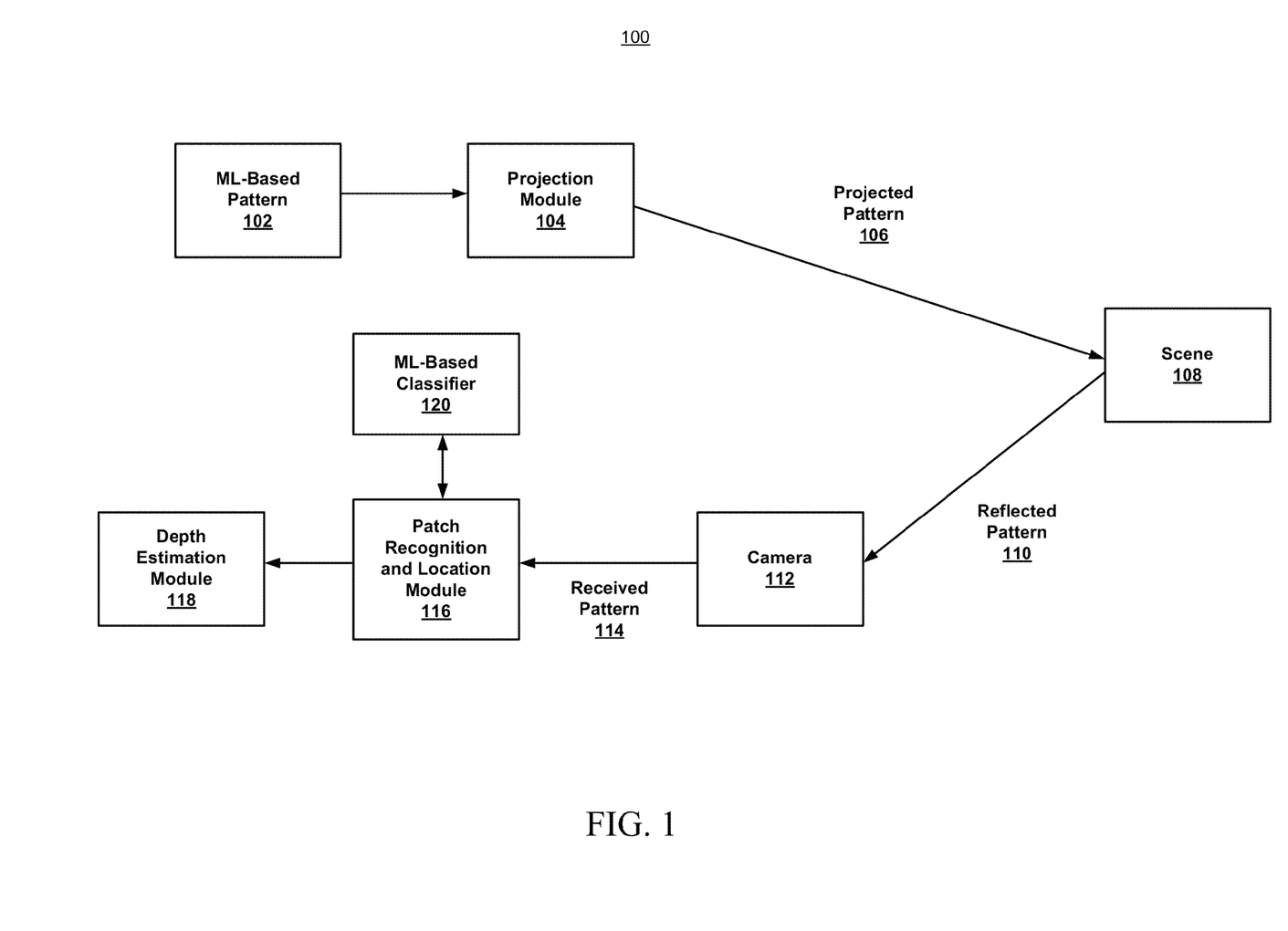
FIG. 1 illustrates a top level system diagram of one example embodiment consistent with the present disclosure.

FIG. 1 illustrates a top level system diagram 100 of one example embodiment consistent with the present disclosure. A projection module 104 is configured to project an ML-based pattern 102 onto a scene 108. The pattern may be projected in the visible light region, infrared (IR) region or any other suitable wavelength region of the spectrum. The pattern 102 is an SL pattern that may be a random arrangement of pixels, at least initially. The pattern may be updated or modified to improve recognition based on the ML techniques described below. The pattern may be composed of groupings of pixels of various intensities, although black and white pixels may generally provide the highest signal to noise ratio (SNR) since it is easier to distinguish between two extreme levels rather than between multiple intermediate levels. In some embodiments, however, multiple levels of gray may be used to encode more information within a given patch area with an associated tradeoff of reduced SNR.

The projected pattern 106 is reflected from the scene 108 and captured by camera 112 as an image of the reflected pattern 110. The received SL pattern 114 provided by camera 112 may differ from the original ML-based pattern 102 that was projected. The differences may be caused by noise, distortion, lighting, reflective properties of the scene (e.g., textures, etc.), distances between projector and scene as well as camera and scene, and imperfections in the projector, the camera and/or other components of the system.

Patch recognition and location module 116 may be configured to recognize patches within the received SL pattern 114. The recognition may be based on ML techniques, as will be described in greater detail below. The ML techniques may be performed by an ML-based system or classifier 120 which may be trained to the ML-based pattern 102, as will also be described below. Once the patch is recognized, a patch label may be retrieved which provides location information associated with the patch. The location information is provided to a depth estimation module 118 which may be configured to triangulate between the projection module 104 and the camera 112 to determine a depth value for a point in the scene at which the patch was projected.

Figure 2:
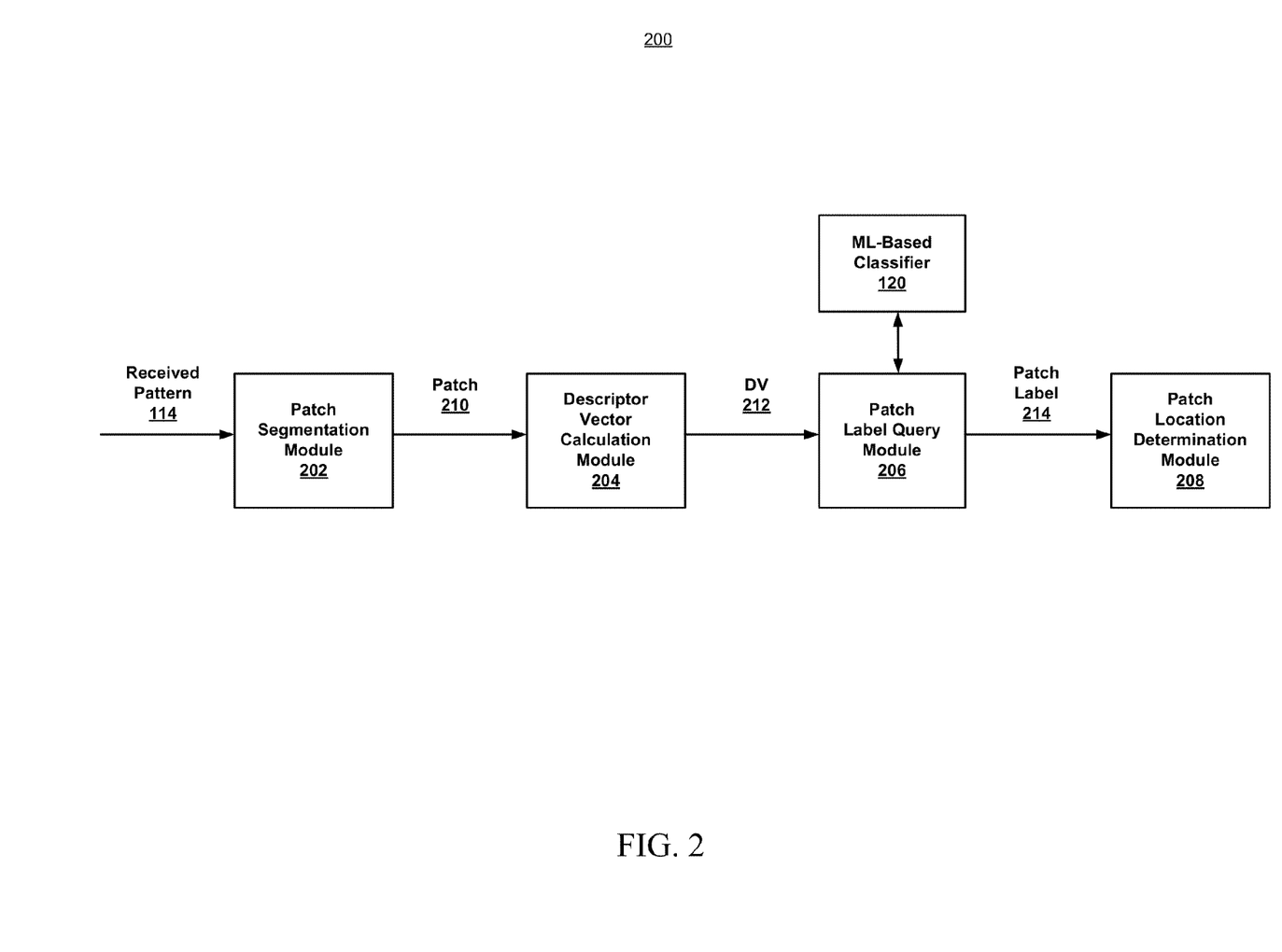
FIG. 2 illustrates a block diagram of one example embodiment consistent with the present disclosure.

FIG. 2 illustrates a block diagram 200 of one example embodiment consistent with the present disclosure. The recognition process (or on-line stage of operation) is described in connection with this figure, while the training process (or off-line stage) is described later in connection with FIG. 7. Patch recognition and location module 116 is shown to include patch segmentation module 202, descriptor vector calculation module 204, patch label query module 206 and patch location determination module 208. Patch segmentation module 202 may be configured to extract or segment a region from the received SL pattern 114. This region or patch includes a number of pixels from the SL pattern. In some embodiments the patch may be rectangular or square. In some embodiments the size of the patch may fall within the range of a 5 by 5 square of pixels (25 pixels) to an 11 by 11 square of pixels (121 pixels), inclusively. The selection of a patch size involves a tradeoff between resolution and recognition. A smaller patch size provides increased spatial resolution but may not encompass as many unique visual features, thus making recognition more difficult.

Descriptor vector calculation module 204 may be configured to calculate descriptor vectors 212 from the segmented patch 210. The descriptor vectors 212 provide a descriptive measure of representative features in the segmented patch (for example, visual symbols) that were encoded in the SL pattern. The descriptor vectors may be calculated from comparisons of the numerical values of neighboring pixels in the segmented patch, as will be described below.

Patch label query module 206 may be configured to query the ML-based classifier 120 with the descriptor vectors and to obtain a patch label in response to the query. The patch label provides information that includes a location of the patch relative to the SL pattern and the patch location determination module 208 may be configured to extract that information for use by the depth estimation module 118. The ML-based classifier 120 enables the patch to be recognized and located without the need to perform a full search over the entire SL pattern, which would be computationally expensive and time consuming.

Figure 3:
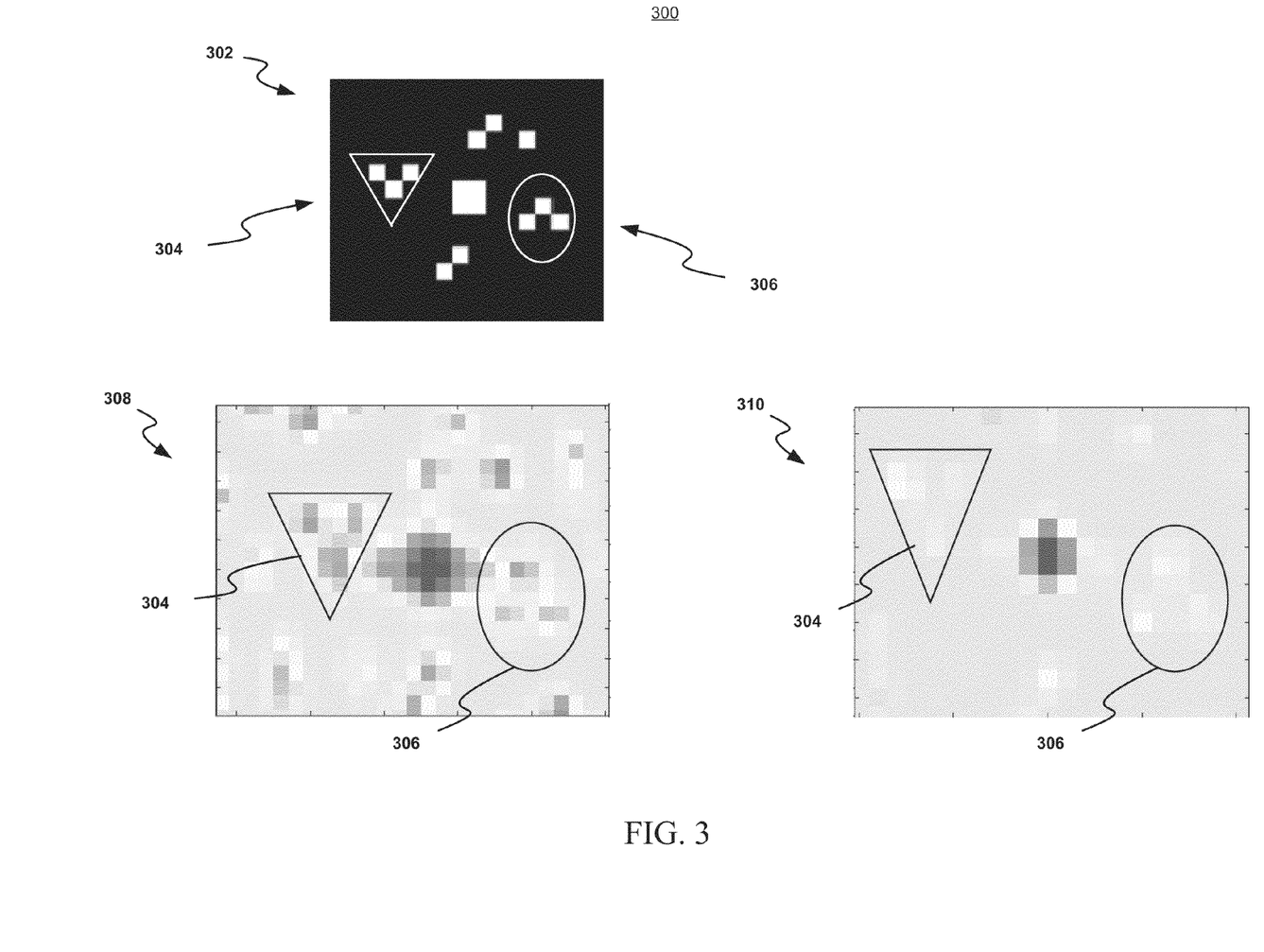
FIG. 3 illustrates example SL patches consistent with an embodiment of the present disclosure.

FIG. 3 illustrates example SL patches 300 consistent with an embodiment of the present disclosure. Patch 302 may, for example, illustrate a patch from the original ML-based pattern 102, while patches 308 and 310 may illustrate a patch from the received pattern 114. A number of visual features or symbols, for example 304 and 306, are visible in patch 302 and are seen to comprise groupings or patterns of individual pixels. These visual symbols are also present in patches 308 and 310, although they appear distorted due to noise and/or environmentally introduced artifacts, etc., which may make them more difficult to recognize. Patch 308 illustrates one example level of distortion while patch 310 illustrates a greater degree of distortion.

Figure 4:
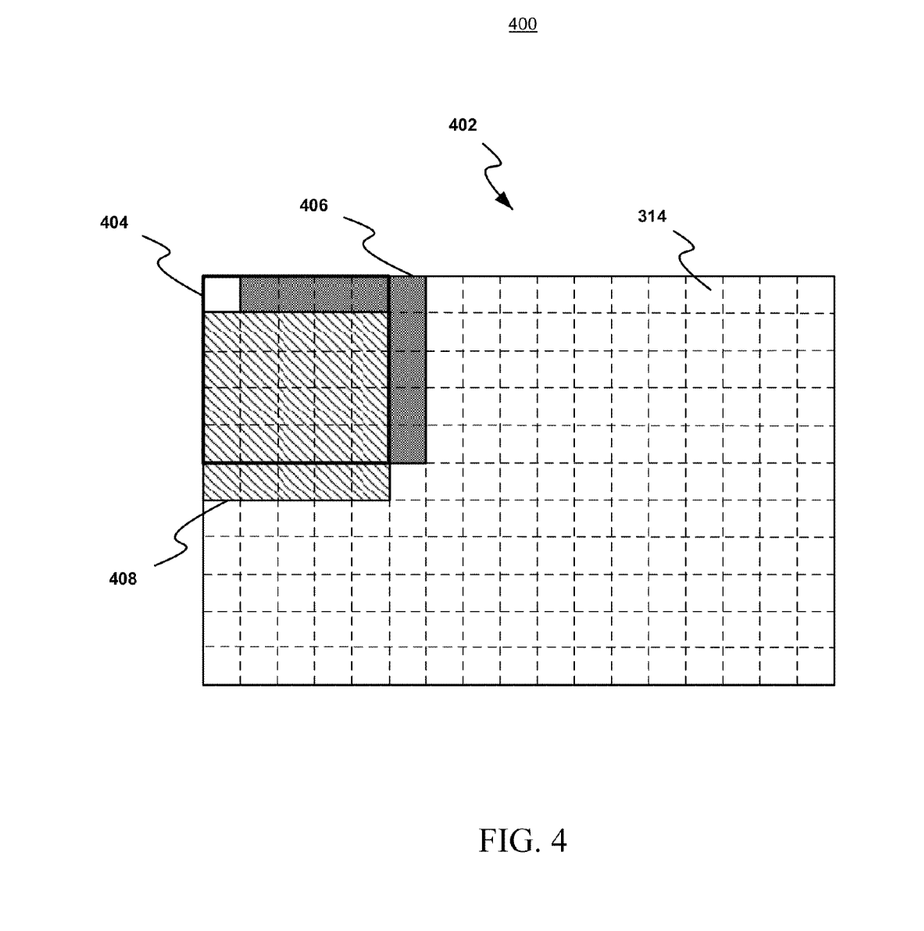
FIG. 4 illustrates an example SL patch segmentation consistent with an embodiment of the present disclosure.

FIG. 4 illustrates an example SL patch segmentation 400 consistent with an embodiment of the present disclosure. A portion of an SL pattern 402 is shown to comprise a number of pixels 314. A first patch 404 may be segmented from the SL pattern 402, for example by patch segmentation module 202. In this example, patch 404 is illustrated as a square patch of size 5 by 5 pixels. A second segmented patch 406 is shown to be extracted from an area that partially overlaps patch 404 but which is shifted one pixel to the right of patch 404. A third segmented patch 408 is shown to be extracted from an area that partially overlaps patch 404 but which is shifted one pixel to down from patch 404. It will be appreciated that the SL pattern 402 may be segmented into any suitable number patches of any suitable size and with any suitable degree of overlap. In some embodiments, there may be no overlap between the segmented patches.

Figure 5:
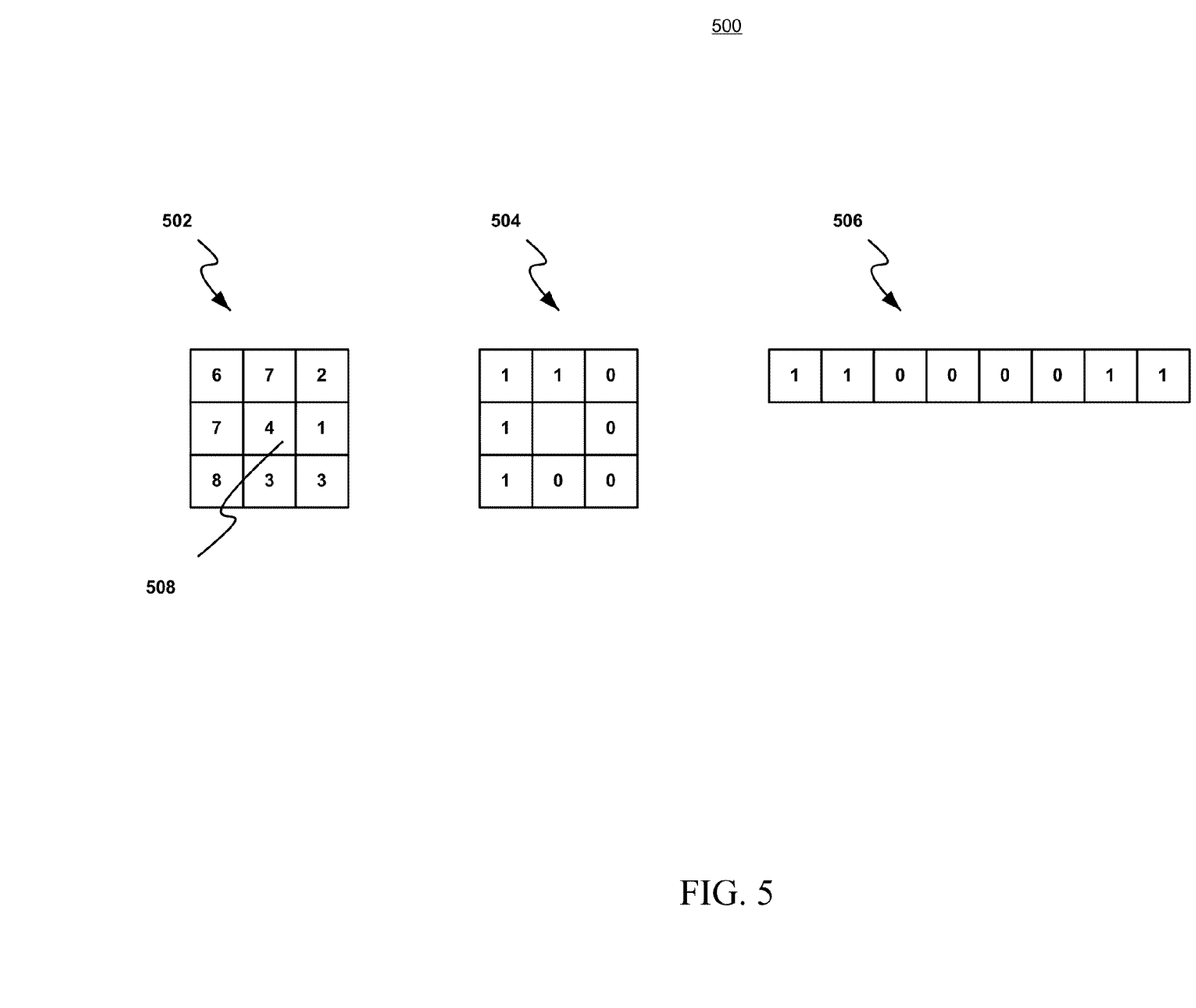
FIG. 5 illustrates an example descriptor calculation consistent with an embodiment of the present disclosure.

FIG. 5 illustrates an example descriptor calculation 500 consistent with an embodiment of the present disclosure. An array of pixels 502 is shown to include 9 pixels arranged in a 3 by 3 square pattern. In this example, a descriptor will be calculated for the center pixel 508, based on the 8 surrounding neighbor pixels. The 3 by 3 size (providing 8 neighbors) is chosen to simplify the illustration, but in practice a larger array of pixels may be used. In some embodiments, for example, the descriptor calculation may be based on 32 neighbors and the arrangement of neighbor pixels need not be limited to a square. In some embodiments, neighbors may not be limited to nearest neighbors but may be chosen based on any suitable geometric or other selected criteria.

Each of the pixels is shown to have a numerical value, for example the top left pixel has a value of 6, the center pixel 508 has a value of 4, etc. The numerical values may correspond to any suitable visual or other attribute of the pixel, such as for example, a brightness or color or grayscale value, etc.

The descriptor value may be calculated for the center pixel 508 as follows. A comparison is performed between the center pixel 508 and each of its neighbors. A second array 504 may be used to store the result of those comparisons. Each element of array 504 may be associated with the comparison of the pixel at the corresponding element of array 502 against the center pixel 508. For example, the top left element of array 504 may be set to a 1 to indicate that the top left pixel of array 502, having a value of 6, is greater than the center pixel value of 4. Similarly, the bottom right element of array 504 may be set to a 0 to indicate that the bottom right pixel of array 502, having a value of 3, is less than the center pixel value of 4. The remaining elements of array 504 are generated in the same manner by comparing the center pixel to the remaining neighbor pixels. The center element of array 504 is left blank since there is no comparison for that element. In this embodiment, a "1" was chosen to indicate "greater than" and a "0" to indicate "less than," however, any values may be used for these purposes, although it may be more efficient to represent the comparisons using a single bit. Additionally, the conditions of either "greater than" or "less than" may be modified to include a comparison result of equality.

The resulting comparisons values in array 504 may be arranged into an N bit word 506 representing the descriptor value, where N is the number of neighboring pixels used in the calculation. In this example, descriptor value word 506 equals "11000011" by reading the elements of array 504 in a clockwise fashion starting from the top left element, although any ordering scheme may be used. A descriptor value may be calculated in this manner for each pixel in the segmented patches 404, 406, 408, or for any suitable subset of pixels in those patches. The resulting descriptor values, associated with each of these pixels, may be aggregated into a descriptor vector that is associated with (e.g., describes) the patch. As an example, if a patch size is chosen to be 7 by 7 pixels and if the descriptor calculations are based on 32 neighbors, then the descriptor values would be 32 bit length words and the descriptor vector would comprise 49 descriptor values for a total of 1568 bits of descriptive information per patch.

A descriptor calculated in above manner (e.g., based on neighboring pixel comparisons) may be referred to as a census based descriptor. In some embodiments, other descriptor calculation techniques may be used.

Figure 6:
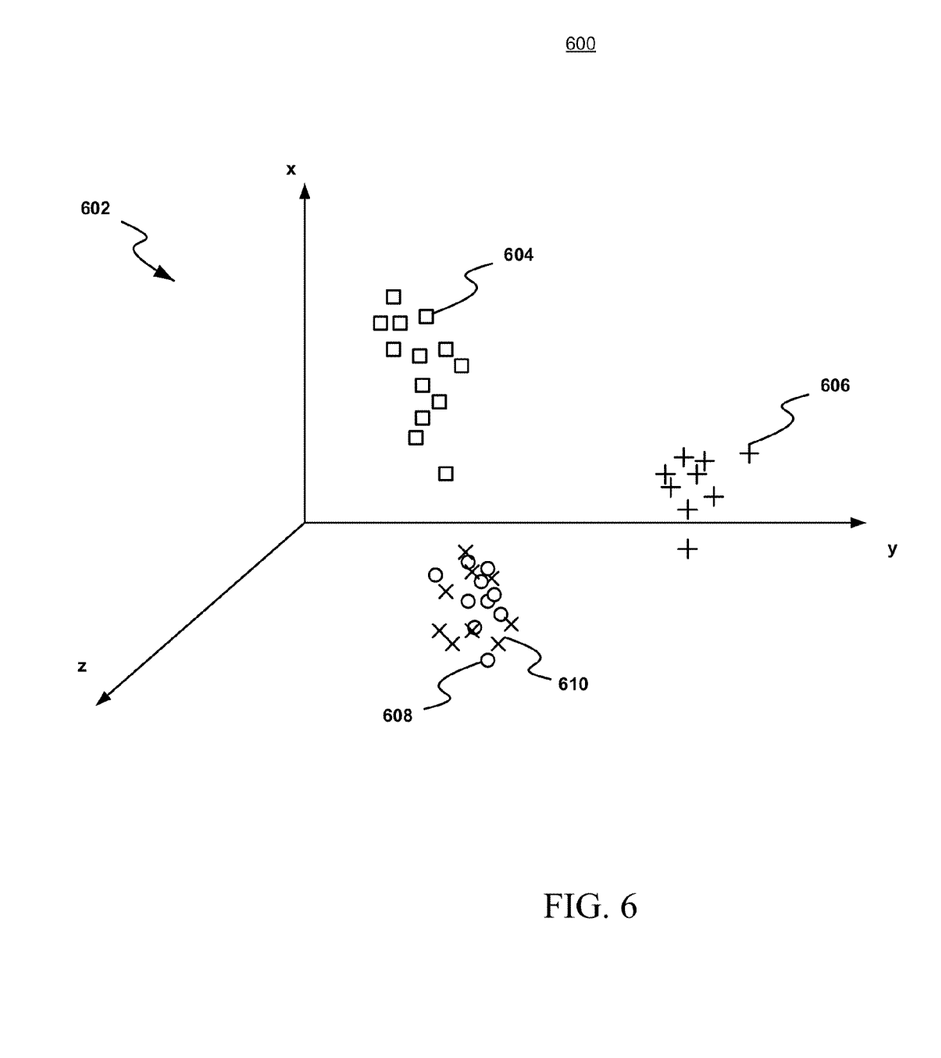
FIG. 6 illustrates an example classifier space consistent with an embodiment of the present disclosure.

FIG. 6 illustrates an example classifier space 600 consistent with an embodiment of the present disclosure. The classifier space 600 is shown as a three dimensional space 602 (with x, y and z labeled axes). The dimensions may correspond to features associated with the patch to be classified. Three dimensions are illustrated here for simplicity, but in practice, a greater number of dimensions may be used. In some embodiments, for example, the number of dimensions may equal the number of descriptor values in a descriptor vector (49 in the above example). In some embodiments, the number of dimensions may equal the total number of bits of descriptive information per patch (1568 in the above example).

The ML-based classifier 120 may be configured to map patches into the classifier space 602 based on the calculated descriptor vector associated with the patch. Descriptor vectors associated with (or mapped to) a first patch are shown grouped into a cluster 604 and descriptor vectors associated with a second patch are shown grouped into a cluster 606. Because clusters 604 and 606, in this example, exhibit relatively high separability in the classifier space, the visual features in the associated patches (e.g., the encoded symbols) may be more distinct from one another and the patches may be more likely to be recognized, even in the presence of noise and distortion. These clusters 604, 606 may be considered distinguishable regions within the classifier space of the ML system. Descriptor vectors associated with a third and fourth patch, however, are shown grouped into clusters 608 and 610 which are less separable in the classifier space. Patches associated with these descriptor vectors may be more difficult to distinguish (e.g., the arrangement of encoded symbols in the patches may look to similar to each other). One or both of these patches may be re-designed to improve recognition performance.

Figure 7:
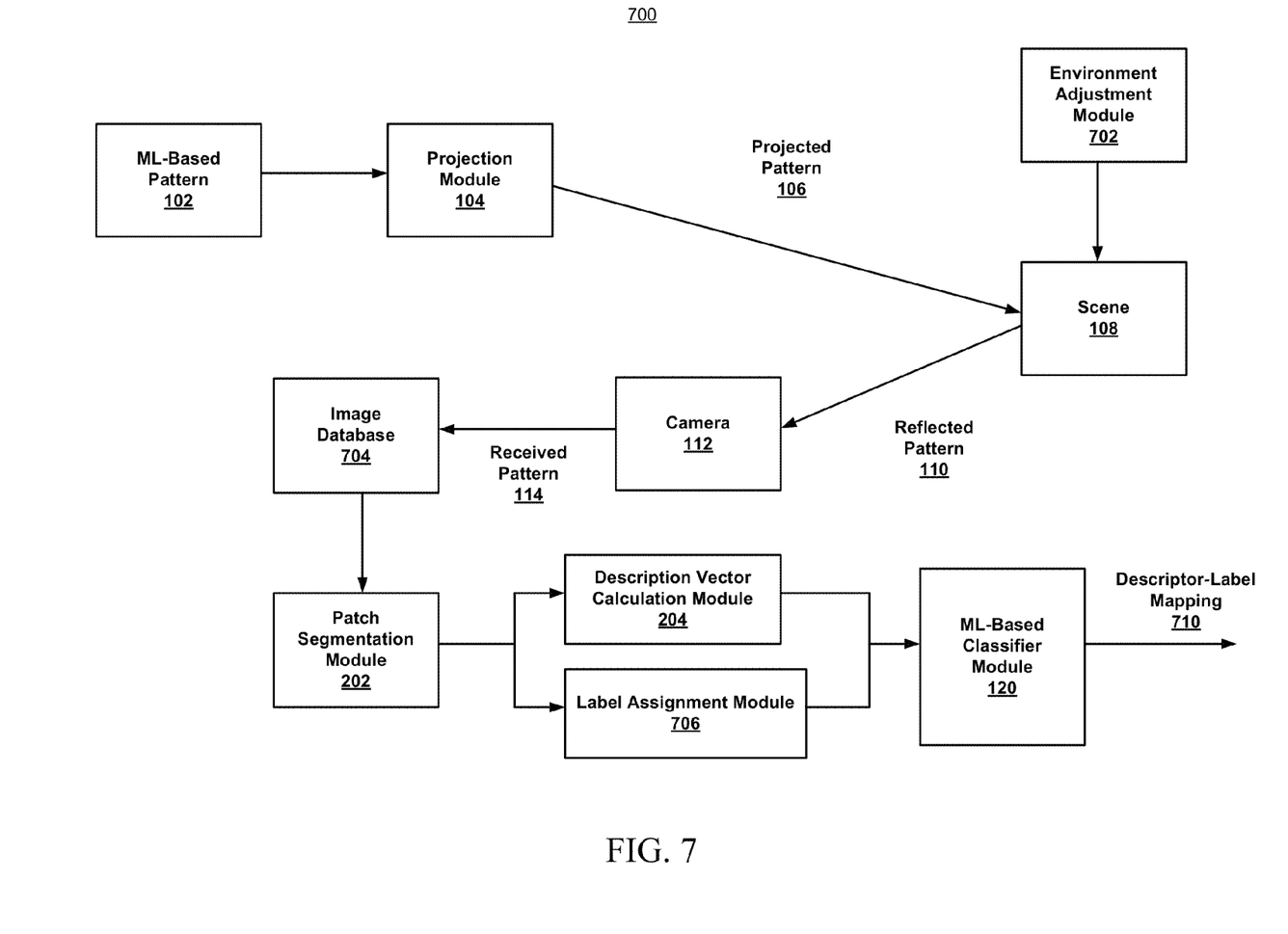
FIG. 7 illustrates a block diagram of another example embodiment consistent with the present disclosure.

FIG. 7 illustrates a block diagram 700 of another example embodiment consistent with the present disclosure. A learning (or off-line) stage is described for the depth camera system. A projection module 104 is configured to project an ML-based pattern 102 onto a scene 108. The pattern 102 is an SL pattern that is constructed from arrangements of pixels creating visual features that can be recognized. The projected pattern 106 is reflected from the scene 108 and captured by camera 112 as an image of the reflected pattern 110. The received SL pattern 114 provided by camera 112 may differ from the original ML-based pattern 102 that was projected. The differences may be caused by noise, distortion, lighting, reflective properties of the scene and imperfections in the projector, the camera and/or other components of the system. Environment adjustment module 702 may be configured to vary the environment and conditions under which the scene is imaged. Multiple received SL patterns 114, each associated with one of the varying environmental conditions, may be collected and stored in an image database 704 which may then be used to train the ML-based system to classify and recognize patterns.

For each of the received SL patterns 114, patch segmentation module 202 may be configured to extract or segment a region from the pattern. This region or patch includes a number of pixels from the SL pattern. In some embodiments the patch may be rectangular or square. In some embodiments the size of the patch may fall within the range of a 5 by 5 square of pixels (25 pixels) to an 11 by 11 square of pixels (121 pixels), inclusively.

Descriptor vector calculation module 204 may be configured to calculate descriptor vectors 212 from the segmented patches. The descriptor vectors 212 provide a descriptive measure of the representative features in the segmented patch that are associated with the visual symbols that were encoded in the SL pattern. The descriptor vectors may be calculated from comparisons of the numerical values of neighboring pixels in the segmented patch, as described previously.

Label assignment module 706 may be configured to generate a patch label to be assigned to each patch and the associated descriptor vector. The patch label includes information about the location of that patch relative to the SL pattern. The location information may be obtained from the patch segmentation module 202, for example based on coordinates of one or more of the pixels in the patch.

The patch label and associated descriptor vector are provided to the ML-based classifier module 120 to train the classifier to recognize the features or patterns associated with the encoded symbols in the labeled patch based on the descriptor vector. The ML-based classifier module 120 may be configured, based at least in part on this training, to categorize and distinguish between patches, for example to find the intrinsic attributes that are embedded in the pattern but buried in the noise, distortion and other artifacts that were introduced into the received image.

In some embodiments, the ML classifier 120 may be configured to use a multi-label technique, where each descriptor vector from the image database 704 is mapped to a patch label according to its location (e.g., descriptor-label mapping 710). With this technique, during the recognition process (the on-line stage), the ML classifier is queried for the patch label corresponding to the descriptor vector. In some embodiments, the classifier 120 may be configured to use a binary technique where each patch label or patch location is associated with its own classifier and descriptor vectors are marked as belonging or not belonging to that patch label. With this technique, during the recognition process (the on-line stage), each patch label is requested to run its classifier to determine whether or not the patch currently being processed belongs to that patch label.

ML-based classifier module 120 may be any known or future developed classifier including, for example, a support vector machine (SVM) classifier, a decision tree classifier or a random forest classifier. For example an SVM classifier may use learning or training algorithms to analyze data and recognize patterns. The training algorithms may be configured to build a model based on training examples that are provided and tagged as belonging to one of a number of classes. The model then accepts new input data and predicts or categorizes a class to which that input data belongs.

Figure 8:
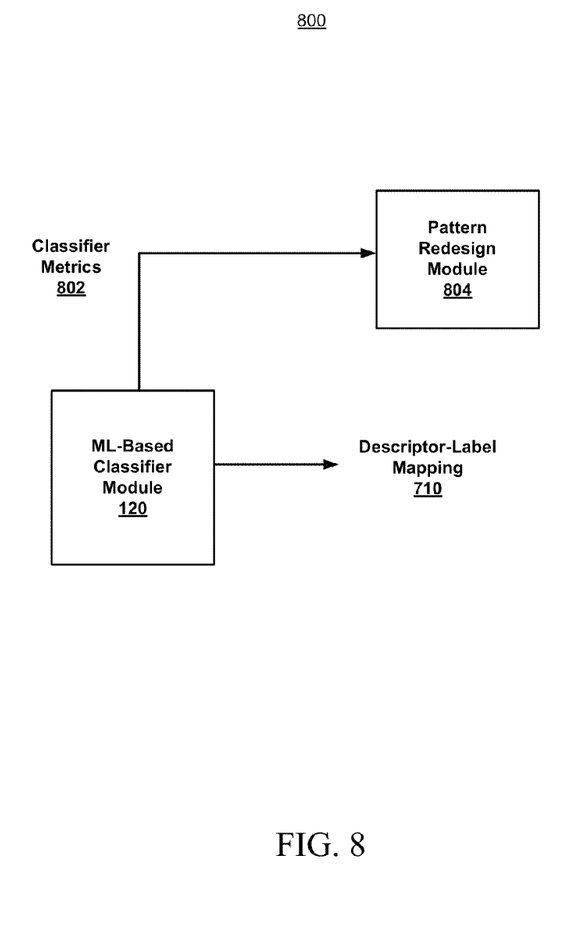
FIG. 8 illustrates a block diagram of another example embodiment consistent with the present disclosure.

FIG. 8 illustrates a block diagram 800 of another example embodiment consistent with the present disclosure. ML-based classifier module 120 may be further configured to produce classifier metrics 802 that indicate how well features may be distinguished. These metrics may be based on distances (in multi-dimensional features space 600) between clusters of descriptor vectors 604, 606, 608 etc. In some embodiments, the distances may be measured in terms of error rates associated with the classification or labeling of features.

Patches that appear similar, visually, may typically be more difficult to distinguish. For example, these similar patches may result in the distance (for example, in terms of error rates) between descriptor vector clusters in the classifier space 600 falling below a threshold, and in such cases the patterns may be re-designed. Pattern re-design module 804 may be configured to modify the SL pattern in local regions associated with these similar patches. In some embodiments, the re-design process may be an iterative process. For example, an initial SL pattern may be created as a random or semi-random pattern, or it may be created to satisfy other requirements. The re-design process may then be performed and iterated in a continuing manner until the classifier metrics reach a desired state. The desired state may, for example, be a state associated with a desired recognition performance level for the overall SL pattern or for selected portions of the pattern.

In some embodiments, epipolar constraints may be used to reduce the number of patch labels needed and further limit the amount of searching required to improve the system performance and reliability. Epipolar constraints allow the search for possible patches to be reduced from a search over all patches within the 2-D SL pattern image to a linear search along a 1-D line within the 2-D SL pattern. This is possible due to the geometry of stereo images. For example, if a single projected ray of light were to be reflected from multiple depths within a scene, each of those reflected rays would be captured somewhere along a linear path in a received image plane.

Figure 9:
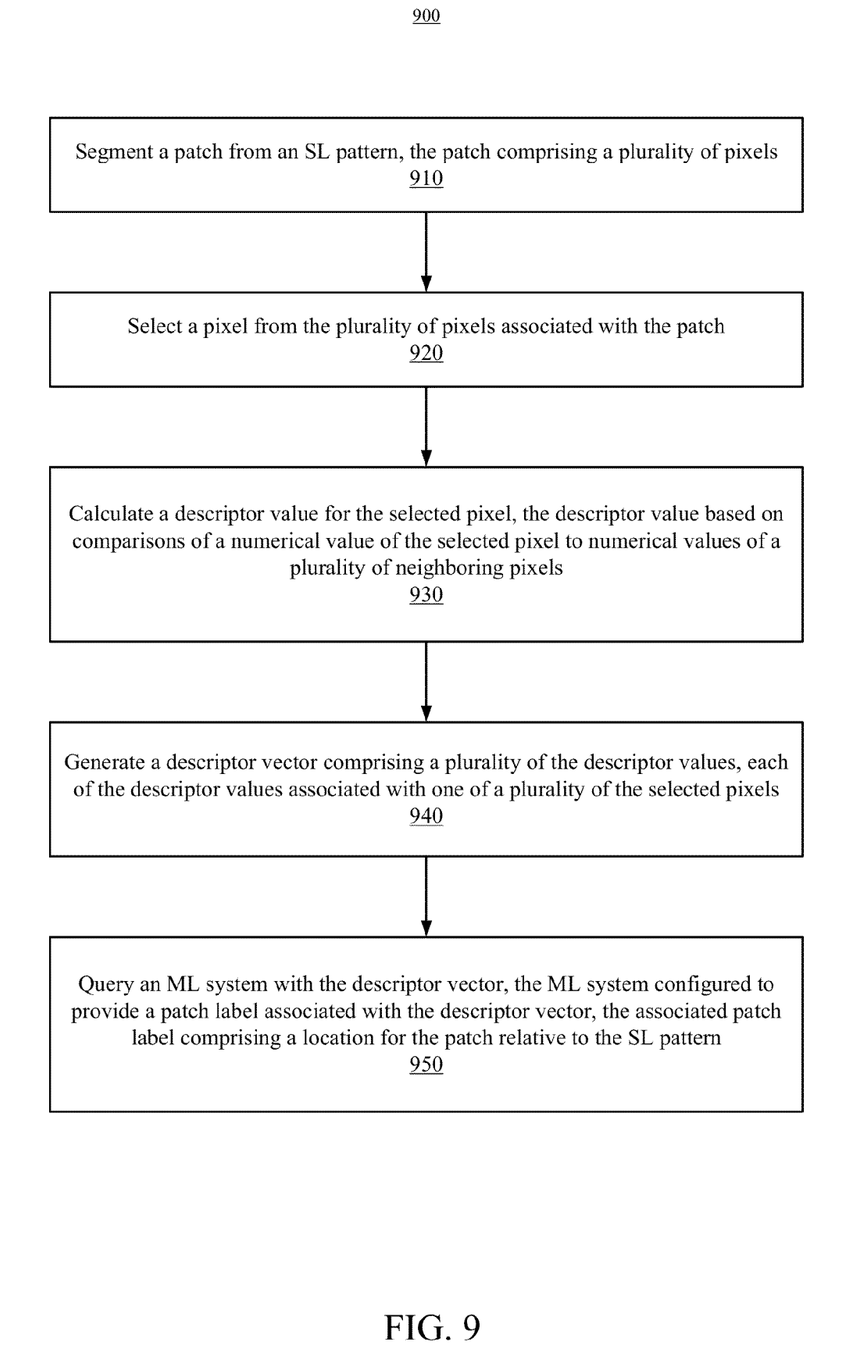
FIG. 9 illustrates a flowchart of operations of another example embodiment consistent with the present disclosure.

FIG. 9 illustrates a flowchart of operations 900 of another example embodiment consistent with the present disclosure. The operations provide a method for recognition of patches in an SL pattern. At operation 910, a patch including a plurality of pixels is segmented from the SL pattern. At operation 920, a pixel is selected from the plurality of pixels associated with the patch. At operation 930, a descriptor value is calculated for the selected pixel. The descriptor value is based on comparisons of a numerical value of the selected pixel to numerical values of a plurality of neighboring pixels. At operation 940, a descriptor vector is generated. The descriptor vector includes a plurality of the descriptor values. Each of the descriptor values is associated with one of a plurality of the selected pixels. At operation 950, an ML system is queried with the descriptor vector. The ML system is configured to provide a patch label associated with the descriptor vector. The associated patch label includes a location for the patch relative to the SL pattern.

Figure 10:
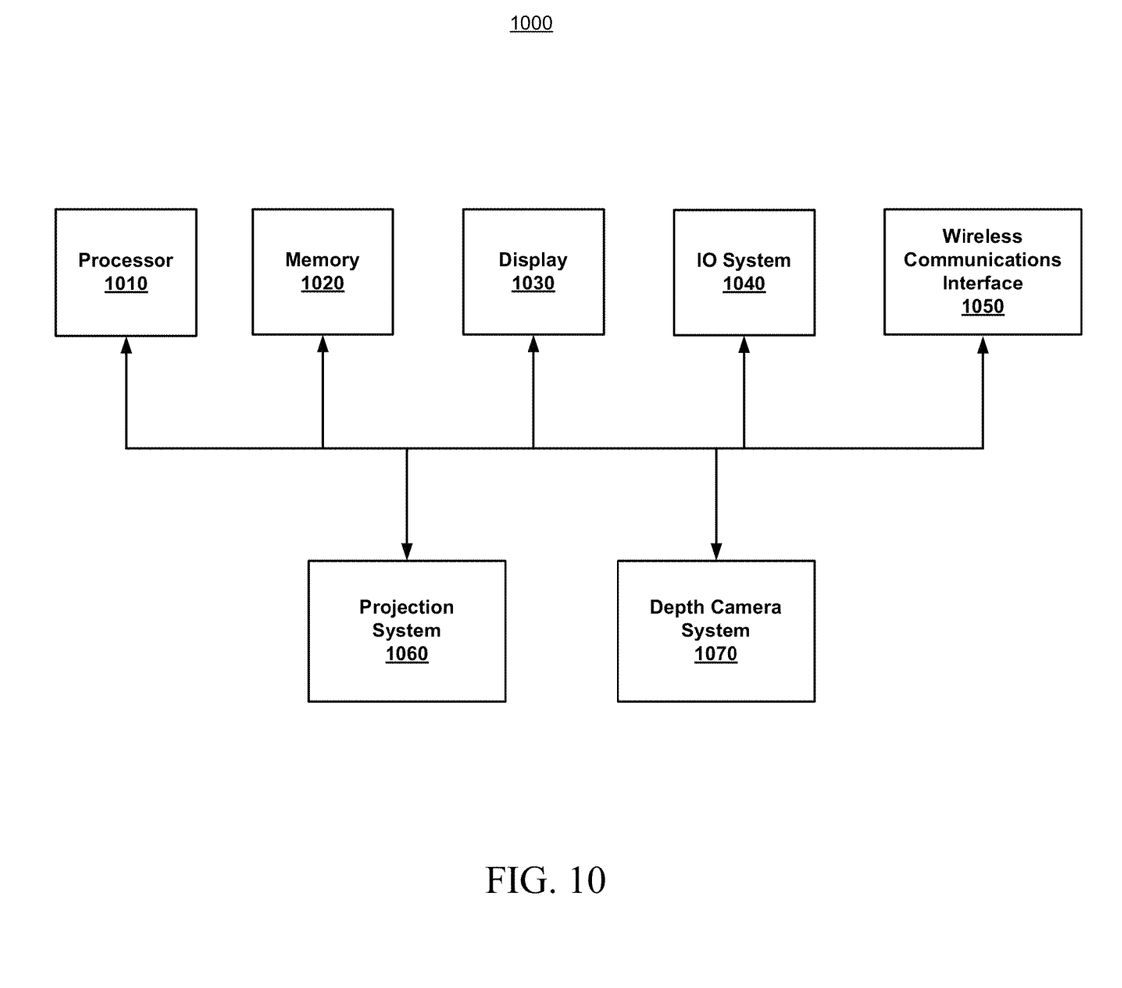
FIG. 10 illustrates a system diagram of another example embodiment consistent with the present disclosure.

FIG. 10 illustrates a system diagram 1000 of another example embodiment consistent with the present disclosure. The system 1000 may be a hardware platform or computing device such as, for example, a smart phone, smart tablet, personal digital assistant (PDA), mobile Internet device (MID), convertible tablet, notebook or laptop computer, desktop computer, server, smart television or any other device whether fixed or mobile. The device may generally present various interfaces to a user via a display 1030 such as, for example, a touch screen, liquid crystal display (LCD) or any other suitable display type.

The system 1000 is shown to include a processor 1010. In some embodiments, processor 1010 may be implemented as any number of processor cores. The processor (or processor cores) may be any type of processor, such as, for example, a micro-processor, an embedded processor, a digital signal processor (DSP), a network processor, a field programmable gate array or other device configured to execute code. Processor 1010 may be a single-threaded core or, a multithreaded core in that it may include more than one hardware thread context (or "logical processor") per core. System 1000 is also shown to include a memory 1020 coupled to the processor 1010. The memory 1020 may be any of a wide variety of memories (including various layers of memory hierarchy and/or memory caches) as are known or otherwise available to those of skill in the art. System 1000 is also shown to include an input/output (IO) system or controller 1040 which may be configured to enable or manage data communication between processor 1010 and other elements of system 1000 or other elements (not shown) external to system 1000. System 1000 may also include wireless communication interface 1056 configured to enable wireless communication between system 1000 and any external entities. The wireless communications may conform to or otherwise be compatible with any existing or yet to be developed communication standards including mobile phone communication standards.

System 1000 is shown to further include projection system 1060 which may include, for example, modules 102 and 104, configured for projection of an ML based SL pattern as described previously. System 1000 is also shown to include depth camera system 1070 which may include, for example, modules 118, 120, 116 and 114 configured to recognize patches within the received SL pattern 114 and estimate depth as described previously.

It will be appreciated that in some embodiments, the various components of the system 100 may be combined in a system-on-a-chip (SoC) architecture. In some embodiments, the components may be hardware components, firmware components, software components or any suitable combination of hardware, firmware or software.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may include, for example, singly or in any combination, hardwired circuitry, programmable circuitry, state machine circuitry, and/or firmware that stores instructions executed by programmable circuitry. An app may be embodied as code or instructions which may be executed on programmable circuitry such as a host processor or other programmable circuitry. A module, as used in any embodiment herein, may be embodied as circuitry. The circuitry may be embodied as an integrated circuit, such as an integrated circuit chip.

Thus, the present disclosure provides systems, devices, methods and computer readable media for a depth camera with ML techniques for recognition of patches within an SL pattern and for generation of SL patterns. The following examples pertain to further embodiments.

The device may include a patch segmentation module configured to segment the patch from the SL pattern, the patch including a plurality of pixels. The system of this example may also include a descriptor vector calculation module configured to calculate a descriptor value for a pixel selected from the plurality of pixels associated with the patch, and the descriptor value is based on comparisons of a numerical value of the selected pixel to numerical values of a plurality of neighboring pixels. The system of this example may further include the descriptor vector calculation module further configured to generate a descriptor vector including a plurality of the descriptor values, each of the descriptor values associated with one of a plurality of the selected pixels. The system of this example may further include a patch label query module configured to query an ML system with the descriptor vector and to receive a patch label associated with the descriptor vector from the ML system. The system of this example may further include a patch location determination module configured to determine a location for the patch relative to the SL pattern based on information provided by the associated patch label.

Another example device includes the forgoing components and the ML system is configured to map the descriptor vector to the associated patch label.

Another example device includes the forgoing components and the ML system includes a database of searchable patch labels and each of the searchable patch labels include a classifier configured to determine if a descriptor vector is associated with the searchable patch label.

Another example device includes the forgoing components and the ML system is further configured to search the database subject to an epipolar constraint.

Another example device includes the forgoing components and the descriptor value is an N bit word, each bit representing the result of the comparison with N of the neighboring pixels.

Another example device includes the forgoing components and the patch includes an area of M pixels, M in the range of 25 to 121.

Another example device includes the forgoing components and the patch segmentation module is further configured to segment the patch from the SL pattern at an offset of one pixel relative to a previously segmented patch.

Another example device includes the forgoing components and the ML system is configured as an SVM, a decision tree classifier or a random forest classifier.

Another example device includes the forgoing components and the SL pattern is configured such that each of a plurality of the descriptor vectors maps to a distinguishable region within a classifier space of the ML system.

Another example device includes the forgoing components and the ML system is configured to measure a classification error rate associated with the patch labels generated in response to the query and the ML system is further configured to modify the SL pattern in response to the error rate exceeding a threshold.

According to another aspect there is provided a method. The method may include segmenting the patch from the SL pattern, the patch including a plurality of pixels. The method of this example may also include selecting a pixel from the plurality of pixels associated with the patch. The method of this example may further include calculating a descriptor value for the selected pixel, and the descriptor value is based on comparisons of a numerical value of the selected pixel to numerical values of a plurality of neighboring pixels. The method of this example may further include generating a descriptor vector including a plurality of the descriptor values, each of the descriptor values associated with one of a plurality of the selected pixels. The method of this example may further include querying an ML system with the descriptor vector, and the ML system is configured to provide a patch label associated with the descriptor vector, the associated patch label including a location for the patch relative to the SL pattern.

Another example method includes the forgoing operations and the ML system is configured to map the descriptor vector to the associated patch label.

Another example method includes the forgoing operations and the ML system includes a database of searchable patch labels and each of the searchable patch labels include a classifier configured to determine if a descriptor vector is associated with the searchable patch label.

Another example method includes the forgoing operations and further includes the ML system searching the database subject to an epipolar constraint.

Another example method includes the forgoing operations and the descriptor value is an N bit word, each bit representing the result of the comparison with N of the neighboring pixels.

Another example method includes the forgoing operations and the patch includes an area of M pixels, M in the range of 25 to 121.

Another example method includes the forgoing operations and further includes segmenting the patch from the SL pattern at an offset of one pixel relative to a previously segmented patch.

Another example method includes the forgoing operations and the ML system is an SVM, a decision tree classifier or a random forest classifier.

Another example method includes the forgoing operations and the SL pattern is configured such that each of a plurality of the descriptor vectors maps to a distinguishable region within a classifier space of the ML system.

Another example method includes the forgoing operations and further includes the ML system measuring a classification error rate associated with the patch labels generated in response to the query and the ML system modifying the SL pattern in response to the error rate exceeding a threshold.

According to another aspect there is provided a system. The system may include a projection module configured to project an ML-based SL pattern onto a scene. The system of this example may also include a camera configured to receive an image of the SL pattern reflected from the scene. The system of this example may further include a patch recognition and location module configured to generate a descriptor vector for a patch segmented from the received image SL pattern and further configured to query an ML system with the descriptor vector, the ML system configured to provide a patch label associated with the descriptor vector, the patch label including a location of the patch relative to the projected SL pattern. The system of this example may further include a depth estimation module configured to triangulate a distance between the camera and a region of the scene associated with the patch based on the location of the patch relative to the projected SL pattern.

Another example system includes the forgoing components and the patch includes a plurality of pixels and the descriptor vector includes a plurality of descriptor values, each of the descriptor values associated with one of a plurality of the pixels.

Another example system includes the forgoing components and the descriptor value is calculated from a comparison of a numerical value of a selected pixel in the patch to numerical values of a plurality of neighboring pixels.

Another example system includes the forgoing components and the system is a smart phone, a laptop computing device, a smart TV or a smart tablet.

Another example system includes the forgoing components and further includes a user interface, and the user interface is a touch screen.

According to another aspect there is provided a system. The system may include a means for segmenting the patch from the SL pattern, the patch including a plurality of pixels. The system of this example may also include a means for selecting a pixel from the plurality of pixels associated with the patch. The system of this example may further include a means for calculating a descriptor value for the selected pixel, and the descriptor value is based on comparisons of a numerical value of the selected pixel to numerical values of a plurality of neighboring pixels. The system of this example may further include a means for generating a descriptor vector including a plurality of the descriptor values, each of the descriptor values associated with one of a plurality of the selected pixels. The system of this example may further include a means for querying an ML system with the descriptor vector, and the ML system is configured to provide a patch label associated with the descriptor vector, the associated patch label including a location for the patch relative to the SL pattern.

Another example system includes the forgoing components and the ML system provides a means for mapping the descriptor vector to the associated patch label.

Another example system includes the forgoing components and the ML system includes a database of searchable patch labels and each of the searchable patch labels include a classifier providing means for determining if a descriptor vector is associated with the searchable patch label.

Another example system includes the forgoing components and the ML system further provides means for searching the database subject to an epipolar constraint.

Another example system includes the forgoing components and the descriptor value is an N bit word, each bit representing the result of the comparison with N of the neighboring pixels.

Another example system includes the forgoing components and the patch includes an area of M pixels, M in the range of 25 to 121.

Another example system includes the forgoing components and further includes a means for segmenting the patch from the SL pattern at an offset of one pixel relative to a previously segmented patch.

Another example system includes the forgoing components and the ML system is an SVM, a decision tree classifier or a random forest classifier.

Another example system includes the forgoing components and the SL pattern is configured such that each of a plurality of the descriptor vectors maps to a distinguishable region within a classifier space of the ML system.

Another example system includes the forgoing components and the ML system further includes a means for measuring a classification error rate associated with the patch labels generated in response to the query and means for modifying the SL pattern in response to the error rate exceeding a threshold.

According to another aspect there is provided at least one computer-readable storage medium having instructions stored thereon which when executed by a processor, cause the processor to perform the operations of the method as described in any of the examples above.

According to another aspect there is provided an apparatus including means to perform a method as described in any of the examples above.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A device for recognizing patches in a structured light (SL) pattern, said device comprising:
    a patch segmentation module to segment said patch from said SL pattern, said patch comprising a plurality of pixels;
    a descriptor vector calculation module to calculate a descriptor value for a pixel selected from said plurality of pixels associated with said patch, wherein said descriptor value is based on comparisons of a numerical value of said selected pixel to numerical values of a plurality of neighboring pixels;
    said descriptor vector calculation module further to generate a descriptor vector comprising a plurality of said descriptor values, each of said descriptor values associated with one of a plurality of said selected pixels;
    a patch label query module to query a machine learning (ML) system with said descriptor vector and to receive a patch label associated with said descriptor vector from said ML system; and
    a patch location determination module to determine a location for said patch relative to said SL pattern based on information provided by said associated patch label.

2. The device of claim 1, wherein said ML system is to map said descriptor vector to said associated patch label.

3. The device of claim 1, wherein said ML system comprises a database of searchable patch labels wherein each of said searchable patch labels comprise a classifier to determine if a descriptor vector is associated with said searchable patch label.

4. The device of claim 3, wherein said ML system is further to search said database subject to an epipolar constraint.

5. The device of claim 1, wherein said descriptor value is an N bit word, each bit representing the result of said comparison with N of said neighboring pixels.

6. The device of claim 1, wherein said patch comprises an area of M pixels, M in the range of 25 to 121.

7. The device of claim 1, wherein said ML system is a support vector machine (SVM), a decision tree classifier or a random forest classifier.

8. The device of claim 1, wherein said ML system is to measure a classification error rate associated with said patch labels generated in response to said query and said ML system is further to modify said SL pattern in response to said error rate exceeding a threshold.

9. A method for recognition of patches in a structured light (SL) pattern, said method comprising:
    segmenting said patch from said SL pattern, said patch comprising a plurality of pixels;
    selecting a pixel from said plurality of pixels associated with said patch;
    calculating a descriptor value for said selected pixel, wherein said descriptor value is based on comparisons of a numerical value of said selected pixel to numerical values of a plurality of neighboring pixels;
    generating a descriptor vector comprising a plurality of said descriptor values, each of said descriptor values associated with one of a plurality of said selected pixels; and
    querying a machine learning (ML) system with said descriptor vector, wherein said ML system is configured to provide a patch label associated with said descriptor vector, said associated patch label comprising a location for said patch relative to said SL pattern.

10. The method of claim 9, wherein said ML system is configured to map said descriptor vector to said associated patch label.

11. The method of claim 9, wherein said ML system comprises a database of searchable patch labels wherein each of said searchable patch labels comprise a classifier configured to determine if a descriptor vector is associated with said searchable patch label.

12. The method of claim 11, further comprising said ML system searching said database subject to an epipolar constraint.

13. The method of claim 9, wherein said descriptor value is an N bit word, each bit representing the result of said comparison with N of said neighboring pixels.

14. A depth camera system comprising:
a projection module to project a machine learning (ML)-based structured light (SL) pattern onto a scene;
a camera to receive an image of said SL pattern reflected from said scene;
a patch recognition and location module to generate a descriptor vector for a patch segmented from said received image SL pattern and further to query an ML system with said descriptor vector, said ML system to provide a patch label associated with said descriptor vector, said patch label comprising a location of said patch relative to said projected SL pattern; and
a depth estimation module to triangulate a distance between said camera and a region of said scene associated with said patch based on said location of said patch relative to said projected SL pattern.

15. The depth camera system of claim 14, wherein said patch comprises a plurality of pixels and said descriptor vector comprises a plurality of descriptor values, each of said descriptor values associated with one of a plurality of said pixels.

16. The depth camera system of claim 15, wherein said descriptor value is calculated from a comparison of a numerical value of a selected pixel in said patch to numerical values of a plurality of neighboring pixels.

17. The depth camera system of claim 14, wherein said system is a smart phone, a laptop computing device, a smart TV or a smart tablet.

18. The depth camera system of claim 17, further comprising a user interface, wherein said user interface is a touch screen.

19. A computer-readable storage medium having instructions stored thereon which when executed by a processor result in the following operations for recognition of patches in a structured light (SL) pattern, said operations comprising:
segmenting said patch from said SL pattern, said patch comprising a plurality of pixels;
selecting a pixel from said plurality of pixels associated with said patch;
calculating a descriptor value for said selected pixel, wherein said descriptor value is based on comparisons of a numerical value of said selected pixel to numerical values of a plurality of neighboring pixels;
generating a descriptor vector comprising a plurality of said descriptor values, each of said descriptor values associated with one of a plurality of said selected pixels; and
querying a machine learning (ML) system with said descriptor vector, wherein said ML system is configured to provide a patch label associated with said descriptor vector, said associated patch label comprising a location for said patch relative to said SL pattern.

20. The computer-readable storage medium of claim 19, wherein said ML system is configured to map said descriptor vector to said associated patch label.

21. The computer-readable storage medium of claim 19, wherein said ML system comprises a database of searchable patch labels wherein each of said searchable patch labels comprise a classifier configured to determine if a descriptor vector is associated with said searchable patch label.

22. The computer-readable storage medium of claim 21, further comprising said ML system searching said database subject to an epipolar constraint.

23. The computer-readable storage medium of claim 19, wherein said descriptor value is an N bit word, each bit representing the result of said comparison with N of said neighboring pixels.

24. The computer-readable storage medium of claim 19, wherein said patch comprises an area of M pixels, M in the range of 25 to 121.

25. The computer-readable storage medium of claim 19, further comprising the operation of segmenting said patch from said SL pattern at an offset of one pixel relative to a previously segmented patch.

26. The computer-readable storage medium of claim 19, wherein said ML system is a support vector machine (SVM), a decision tree classifier or a random forest classifier.

27. The computer-readable storage medium of claim 19, wherein said SL pattern is configured such that each of a plurality of said descriptor vectors maps to a distinguishable region within a classifier space of said ML system.

28. The computer-readable storage medium of claim 19, further comprising said ML system measuring a classification error rate associated with said patch labels generated in response to said query and said ML system modifying said SL pattern in response to said error rate exceeding a threshold.

* * * * *